United States Patent [19]

Pegoraro

[11] Patent Number: 5,046,346
[45] Date of Patent: Sep. 10, 1991

[54] AGRICULTURAL MACHINE

[76] Inventor: Vittorio Pegoraro, Via Torri di Confine 7, Gambellara 36053, Italy

[21] Appl. No.: 440,512

[22] Filed: Nov. 22, 1989

Related U.S. Application Data

[63] Continuation of Ser. No. 945,657, Feb. 6, 1987, abandoned, and a continuation of Ser. No. 368,921, Jun. 19, 1989, abandoned.

[30] Foreign Application Priority Data

Apr. 3, 1985 [IT] Italy .............................. 12471 A/85

[51] Int. Cl.$^5$ .............................................. A01B 9/00
[52] U.S. Cl. ........................................ 172/71; 172/73; 172/124; 172/180; 172/196
[58] Field of Search ........................ 172/27, 28, 42, 43, 172/56, 63, 69, 71, 81, 105, 106, 119, 123, 124

[56] References Cited

U.S. PATENT DOCUMENTS

| 837,799 | 12/1906 | Cook | 172/124 |
| 1,237,446 | 8/1917 | Arce | 172/69 |
| 1,690,922 | 11/1928 | Brack | 172/69 X |
| 3,185,220 | 5/1965 | Tanoue | 172/69 |

FOREIGN PATENT DOCUMENTS

2127262 4/1984 United Kingdom ................. 172/71

Primary Examiner—Brian S. Steinberger
Attorney, Agent, or Firm—Cohen, Pontani & Lieberman

[57] ABSTRACT

The invention relates to an agricultural machine for soil-cultivation, comprising, in the direction (F) of travel of the machine, a first row of cutting wheels arranged at right-angles to the said direction of travel and having substantially horizontal axes, in front of which is arranged a cylindrical roller with the aid of which weeds and/or the remains of past cultivation, such as stalks, stubble, and the like may be broken up. A subsequent row of ripping elements, with blades preferably running out to a point, rips up and loosens the soil, without ploughing it in, and is associated with plough-mould-boards which partially plough in the loosened soil. A transverse row of rotor-tools, with substantially horizontal axes, acts as a harrow and is used for final ploughing through 180° and for crumbling the soil. The cutting wheels and the rotor-tools are arranged with their axes at an angle to the perpendiculars to the direction of travel (F) of the machines, preferably at an angle of between 5° and 45°, whereas the ripping elements run in the said direction of travel (F).

23 Claims, 5 Drawing Sheets

AGRICULTURAL MACHINE

This is a continuation of application Ser. No. 945,657, filed Feb. 6, 1987, and Ser. No. 368,921, filed June 19, 1989, now both abandoned.

BACKGROUND OF THE INVENTION

The invention relates to an agricultural machine for soil-cultivation comprising a plurality of rows of cultivating tools, each row being arranged upon an axis running at an angle to the direction of travel of the machine.

A machine of this kind is described and illustrated in French Patent 1,501,969. Arranged in this machine in front of a row of plough-like tools is a row of freely rotatable discs the purpose of which is to cut the soil into strips which are then lifted by the plough-like tools and are placed upon plant-material lying on the ground. A final row of tools is designed to break up the strips of soil, but without picking up any plant-material.

This machine is limited by the fact that plant-material, which may consist of the remains of previous cultivation, or which has grown in soil not yet used for agricultural purposes, cannot be used as a natural fertilizer because it has not yet been adequately treated for composing in a decomposition process.

SUMMARY OF THE INVENTION

It is the purpose of the invention to make available a machine of the type mentioned hereinbefore which will make it possible to process plant-material present in the soil in such a manner that it can break down into natural fertilizer for subsequent agricultural use.

In the case of a machine for soil-cultivation of the type outlined at the beginning hereof, this purpose is accomplished by a first device for breaking up plant-material.

This device preferably consists of an element for bending the plant-material towards the soil, and of a subsequent row of rotating blades for breaking up the plant material against the soil.

A machine of this kind meets, in exemplary fashion, a requirement which is particularly important in modern agriculture, namely that the use of as much natural fertilizer as possible is preferable to the use of often excessive amounts of artificial fertilizer, the said natural fertilizer being obtained much less expensively and with far less environmental pollution by decomposition of already available vegetable material.

At present, known devices for breaking up plant-material operate in such a manner that soil is not picked up, only the stalks, stubble and other elements located above the ground being broken up, since the devices operate in the air. The machine according to the invention lacks this disadvantage since it breaks up the plant-material towards the soil, thus producing a layer consisting of broken-up plant-material mixed with soil.

According to additional characteristics of the invention, the machine comprises, behind the first device for breaking up plant-material a row of ripping elements for lifting the soil and ploughing-in the broken-up plant-material, together with a subsequent row of breaking-up tools which act as a harrow, crumbling and turning the soil, lumps and clods and finally completing the covering of broken-up plant-material with crumbled soil.

With a machine of this kind, it is possible to obtain a stratum, between 10 and 40 cm in thickness, consisting of a first layer of crumbled earth, a second layer of crumbled earth mixed with broken-up plant-material, and a third layer of earth ripped by the break-up tools, but failing to reach the surface; these three layers provide the most favourable conditions for the exchange of air and water in the soil, thus accelerating the decomposition of organic residues and creating the best conditions for raising new plants.

Another advantage is the considerable saving in energy made possible by the use of the machine according to the invention, as compared with conventional machines such as the plough. A plough requires the use of a tractor, the output from which is considerably greater than that required by the machine according to the invention. In order to achieve a result comparable with that obtainable with the machine according to the invention, it would be necessary to use several agricultural appliances, namely a unit for cutting stalks, a ripping unit, a plough, and a harrow. This means that the tractor would have to make several passes over the ground, whereas with the machine according to the invention only one pass is necessary.

Furthermore, in contrast to known agricultural machines of the type already described, the machine according to the invention does not create a smooth division between the layer of cultivated soil and the soil thereunder. Instead, it creates the best conditions for ensuring that the lower layers of soil participate in an exchange of air and water with the layer lying thereabove.

In the event that the ground is bare, with no remains from previous cultivation and no weeds, it is sufficient to use that part of the machine according to the invention which carries the ripping elements and the break-up tools.

BRIEF DESCRIPTION OF THE DRAWINGS

Further characteristics and advantages of the invention may be gathered from the remaining claims and from the following description of the examples of embodiments illustrated in the drawing attached hereto, wherein:

DETAILED DESCRIPTION OF THE INVENTION AND EMBODIMENTS

Figure 1:
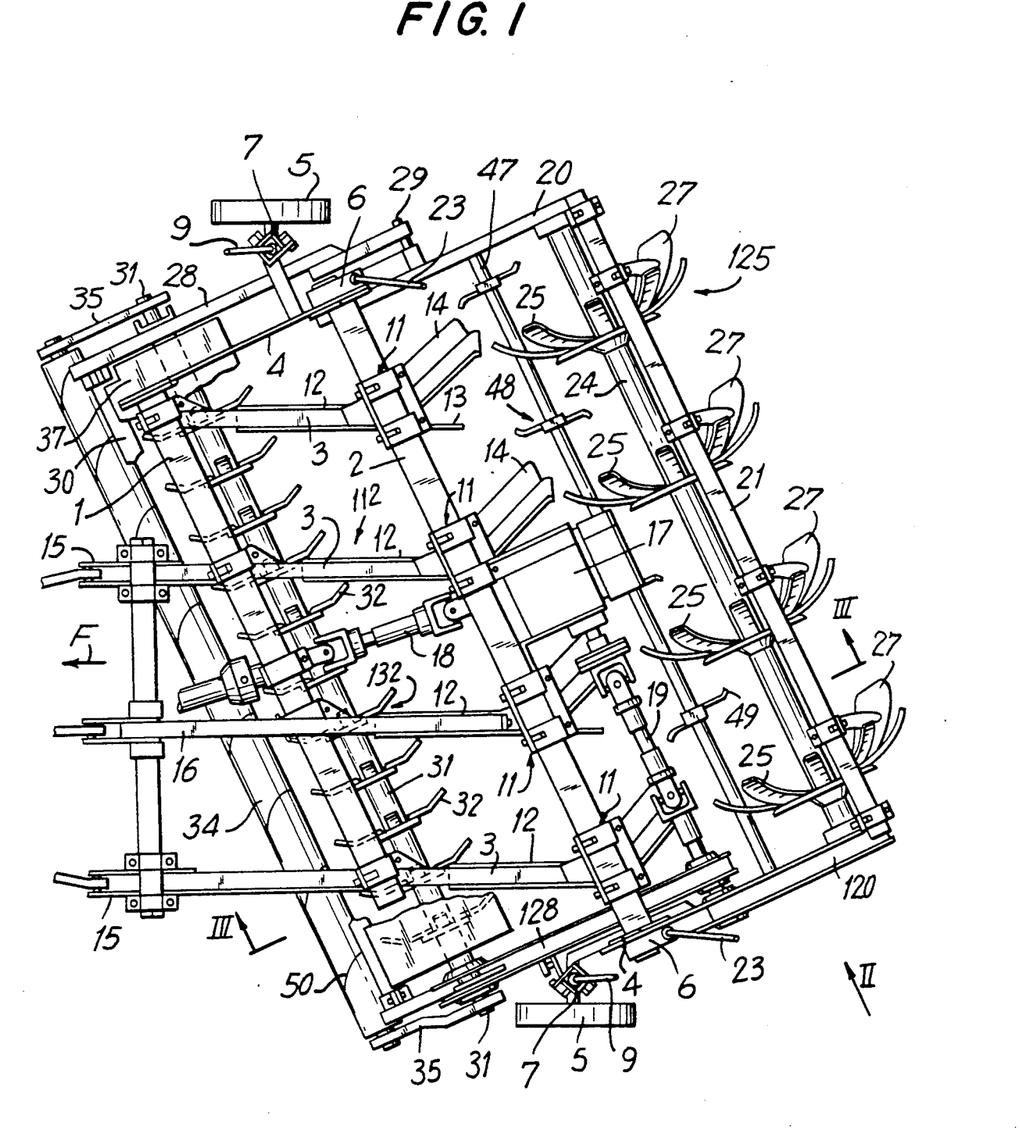
FIG. 1 is a plan view of an agricultural machine according to the invention.
Figure 2:
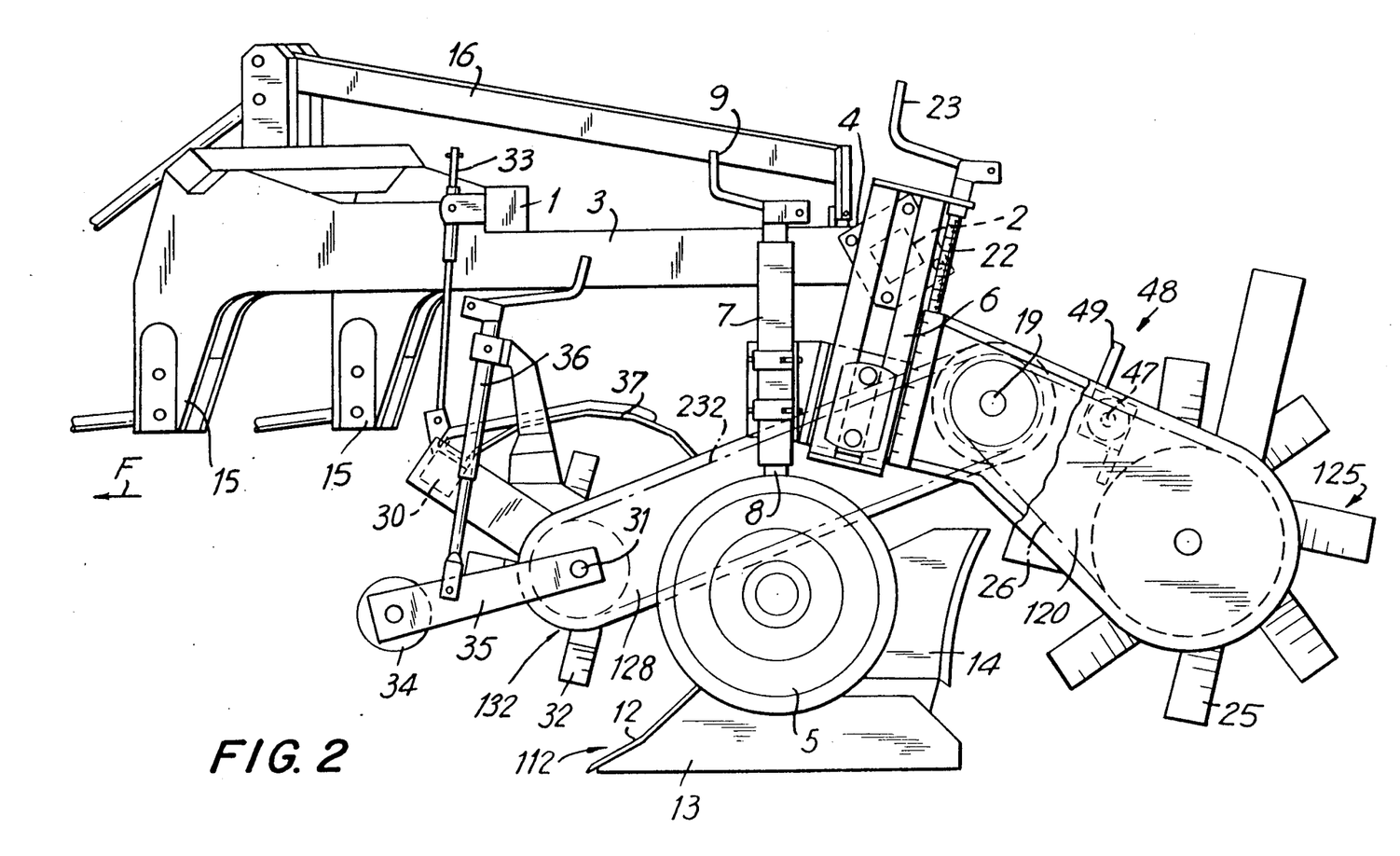
FIG. 2 is a side elevation of the machine, as seen in the direction of arrow II in FIG. 1.
Figure 3:
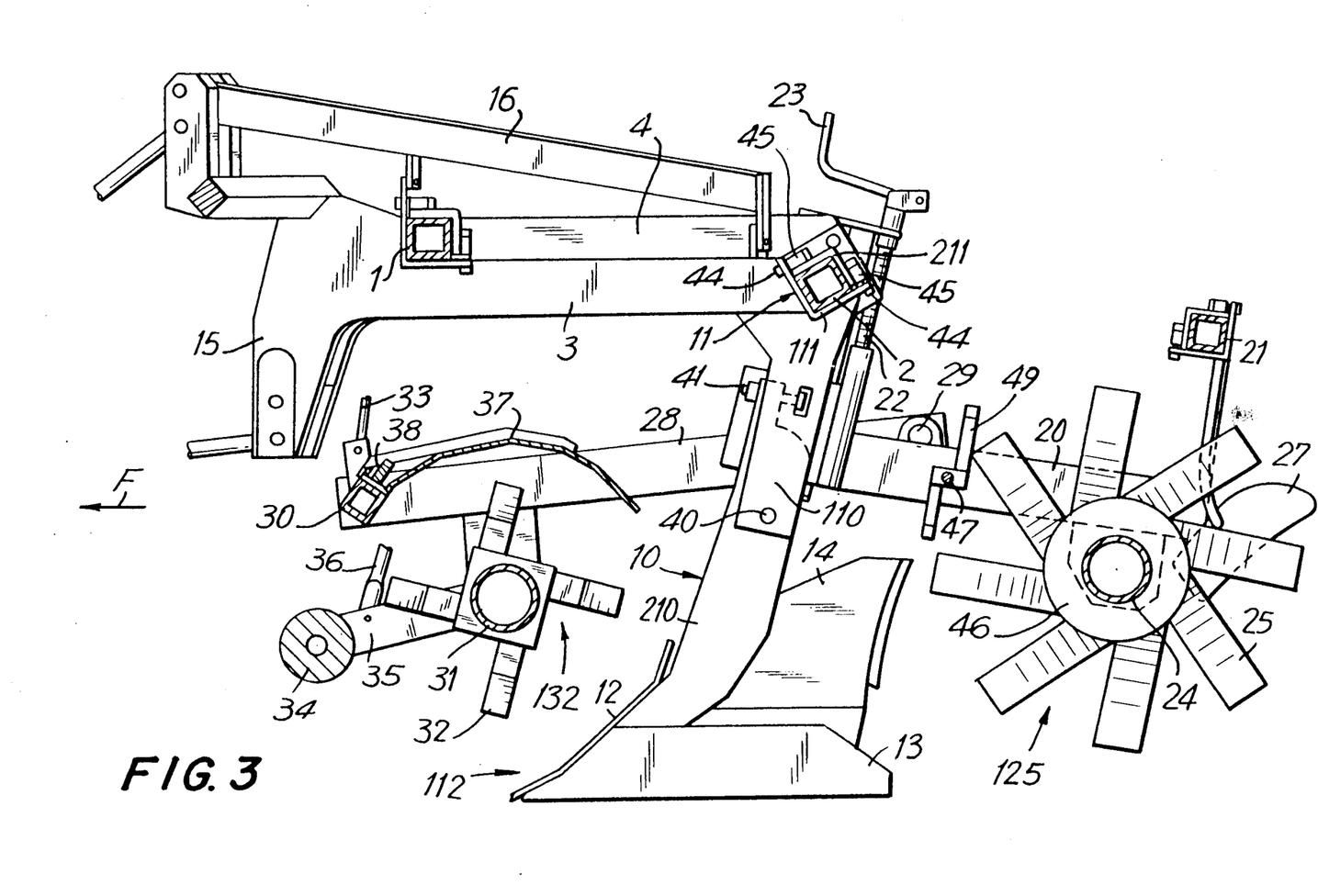
FIG. 3 is a longitudinal section through the machine in the plane III—III in FIG. 1.

The agricultural machine for soil-cultivation shown in FIGS. 1 through 3 has a basic frame comprising a front cross-member 1 and a rear cross-member 2 connected together by intermediate struts 3 and lateral struts 4. Cross-members 1 and 2 run parallel with each other, but at an angle to direction of travel F of the machine, namely at an angle of between 5° and 45°, preferably about 20°, to the direction of travel. Lateral struts 4 run at right angles to cross-members 1 and 2. Intermediate struts 3 run parallel with the direction of travel and thus at an angle to cross-members 1 and 2.

Basic frame 1,2,3,4 carries, in the vicinity of rear cross-member 2, two laterally arranged wheels 5 which are adjustable in height and which allow the basic frame to run over the ground. In the example of embodiment shown, a lateral support 6 is secured to each end of rear cross-member 2. Connected to the said support is a vertical guide-tube 7 in which a leg 8 is guided displaceably, the said leg carrying at its lower end a wheel 5 and being adjustable in height by means of a manually operated adjusting spindle 9. Wheels 5 are aligned in the direction of travel of the machine, i.e. the horizontal axes of rotation thereof run at right angles to the said direction of travel. The said wheels, used to adjust height, may be removable or may be adapted to swing inwardly in order to reduce the width of the machine during transportation.

Rear cross-member 2 is preferably square in cross-section and is used to carry a row of ripping element 112, each of which has an arm 10 which is secured by means of a clamp 11 to cross-member 2, is directed towards the ground, and is preferably inclined slightly forwardly. The lower end of arm 10 of each ripping element carries a blade 12 which preferably runs out to a point.

Although the said ripping elements are secured to cross-member 2 which runs at an angle to direction of travel F of the machine, they are aligned in the said direction of travel. Each ripping element carries at its lower end a substantially vertical guide-plate 13 which is secured to one side of arm 10, from which it extends rearwardly. Guide-plate 13 performs a steering function. It holds the machine to its direction of travel by counteracting the lateral forces produced by the tools. The latter are arranged in front of and behind ripping elements 112 and the axes thereof, as indicated hereinafter, run at an angle to the direction of travel of the machine. Secured to the lower end of each arm 10, on the side opposite to guide-plate 13, is a plough-mould-board 14 which extends rearwardly. The height of this board on arm 10 of the ripping element may be altered and adjusted.

Figure 4:
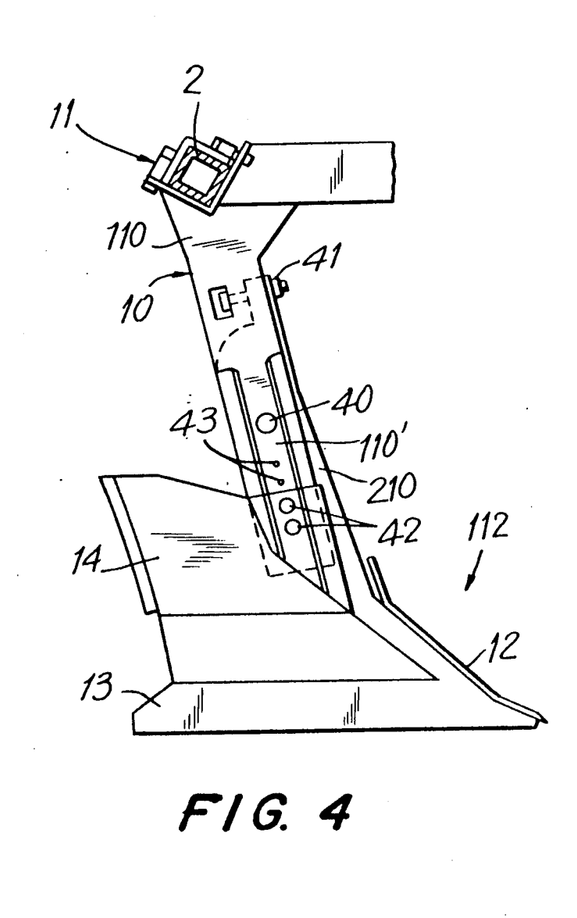
FIG. 4 is a side elevation of a ripping element.
Figure 5:
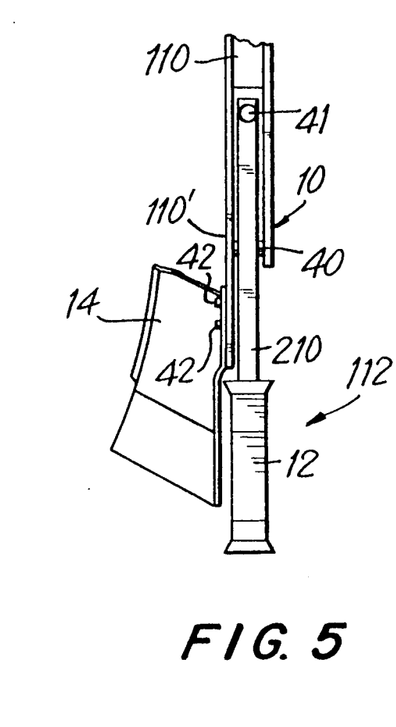
FIG. 5 is a front elevation of a ripping element.

As shown more particularly in FIGS. 4 and 5, arm 10 of each ripping element 112 has an upper arm 110 which is preferably forked and is secured by means of a clamp 11 to cross-member 2 of the basic frame. Connected to upper arm 110 is a lower arm 210 which is hinged thereto by a pin 40. The upper end of lower arm 210 is secured to upper arm 110 by means of a bolt 41 loaded in tension. Lower arm 210 carries both blade 12 and guide-plate 13. On the other hand, plough-mould-board 14 is secured to a lower extension 110' of upper arm 110. The said board may be adjusted in height by means of screws 42 and a vertical row of holes 43 arranged in lower extension 110'. If blade 12 of ripping element 112 strikes an unduly hard obstacle bolt 41 breaks, so that lower arm 210 may pivot away about hinge-pin 40. Plough-mould-board 14 is designed in such a manner that blade 12 can pivot past it when bolt 41 breaks. Guide-plate 12, of course, also absorbs the lateral forces produced by the said plough-mould-board.

In the exemplary embodiment shown, upper arm 110 of each arm 10 is secured to cross-member 2 by means of a specially designed clamp 11. Cross-member 2 has a hollow square cross-section standing on edge, i.e. the diagonal runs substantially vertically. Clamp 11 consists of two gripping jaws 111 and 211 with an angular profile. As compared with jaw 211, jaw 111 has longer legs extending beyond the free ends of the legs of jaw 211. The said jaws are secured and tightened to each other by means screws 44 which pass through holes in the longer legs of jaw 111 and are screwed into bushings 45 which run parallel with the legs of jaw 211 and are secured thereto, for example by welding.

The front of basic frame 1,2,3,4 comprises two lower arms 15, and an upper arm 16 therebetween, for attachment to a known three-point power-lift of a tractor. Arms 15 and 16 run parallel with the direction of travel of the machine. With the aid of the three-point mounting provided by arms 15,16, the basic frame, and thus the entire machine may be lifted and transported by the tractor. For soil-cultivation, the machine runs on lateral wheels 5 and is towed by the tractor. The operating depth of ripping elements 112 may be set by adjusting the height of wheels 5 in relation to the basic frame.

Secured to rear cross-member 2 of the basic frame is an angle-gear 17 which also comprises a gearbox by means of which the rotational speed can be altered. The input to this gearbox is connected by a cardan-shaft to the power-take-off of the tractor, whereas the output is coupled to a cardan-shaft 19 running in the transverse direction.

Secured to the rear end of basic frame 1,2,3,4 is a rear auxiliary frame consisting of two lateral struts 20,120 connected together by a rear cross-member 21. Each of the said lateral struts is connected to one of lateral supports 6 of the basic frame and is guided displaceably in the longitidinal direction thereof. Adjustment of the height of lateral struts 20,120 of the rear auxiliary frame, in the guides of lateral supports 6, may be effected, for example, by means of the handles 23 of manually operated adjusting spindles 22. Mounted rotatably between lateral struts 20,120, under cross-member 21, is a shaft 24 to which rotor-tools 125, for breaking up and turning the soil, are secured. The said shaft runs at an angle to the direction of travel F of the machine, in fact at the same angle (e.g. about 20°) as cross-members 1 and 2 of the basic frame. Shaft 24 is coupled to cardan-shaft 19 of angle-drive 17 by means of a chain-drive 26 arranged in box-shaped lateral strut 120 of rear auxiliary frame 20,120,21. Each rotor-tool 125, for breaking up and turning the soil, consists of series of scoops 25 which are spaced angularly from each other and which may be curved, for example, in such a manner that, as shown in FIG. 1, the rotor tool has approximately the shape of a spherical shell. Associated with each rotor-tool is a scraper-blade 27 which is secured to cross-member 21, lying above it, of the rear auxiliary frame and which co-operates with rotor-tool scoops 25, in order to scrape the soil therefrom and to complete the turning of the crumbled soil.

The scoops of each rotor-tool are secured to a hub 46 which is in turn secured to shaft 24. The said scoops are preferably twisted radially in such a manner that they act as a harrow and as an element for turning, thus completing the covering of the broken-up plant-material with crumbled soil. To this end the said scoops run at an angle to the radial direction of hub 46.

Scoops 25 do not operate in the furrows formed by blades 12 of ripping elements 112; instead they operate between the said furrows. As a result of this they do not produce a solid base, they merely lift pure soil.

It is desirable for the rotational speed of shaft 24, and therefore that of rotor-tools 125, to be variable. At high r.p.m., the rotor-tools bring more pure soil to the top, whereas at low r.p.m., less soil is brought u and there is less ploughing-under.

Located between ripping elements 112 and tools 125, for breaking up and final turning of the soil, is an intermediate shaft 47 carrying a row of clod-breakers 48, each of which consists of two blades 49 arranged diametrically opposite each other and together forming an S-shaped profile, as shown in FIG. 1. The rotational speed of the said intermediate shaft is higher than that of rotor-tools 125. The purpose of clod-breakers 48 is to break up large lumps of earth which has been lifted by plough-mould-boards 14 at the rear of ripping elements 112.

Located under basic frame 1,2,3,4 is a front auxiliary frame having two lateral struts 28,128 which are hinged to relevant lateral struts 20,120 of the rear auxiliary frame and pivot about a horizontal axis 29 running coaxially with cardan-shaft 19 in box-like lateral strut 120 of the said rear auxiliary frame. The front ends of lateral struts 28,128 of the front auxiliary frame are connected together by a cross-member 30. Mounted rotatably in front of the ripping elements, and between lateral struts 28,128 of the front auxiliary frame, is a shaft 31 which is connected to cardan-shaft 19 of angle-gear 17 by a chain-drive 232 which is accommodated in box-like lateral strut 128 of front auxiliary frame 28,128,30. Like cross-member 21 of the auxiliary frame, and shaft 24 of rotor-tools 125, cross-member 30 and shaft 31 of the front auxiliary frame run at an angle to the of direction of travel F of the machine, preferably the same angle given in the exemplary embodiment, namely about 20°. Cross-members 1 and 2 of the basic frame, cross-member 21 of the rear auxiliary frame, cross-member 30 of the front auxiliary frame, and shafts 24, 31 and 47 are preferably parallel with each other and run at an angle to the direction of travel of the machine.

Secured to shaft 31 in front auxiliary frame 28,128,30 are cutting wheels 132, each of which consists of a plurality of blades 32 spaced angularly in relation to each other. Cutting wheels 132 may be designed like milling-cutters. Front auxiliary frame 28,128,30 may be raised and lowered by pivoting about horizontal rear axis 29 which runs parallel with cardan-shaft 19 and by means of which it is hinged to lateral struts 20,120 of the rear auxiliary frame. This may be accomplished, for example, by means of an adjusting spindle 33 which is operated manually and which is connected, on the one hand, to cross-member 30 of the front auxiliary frame and, on the other hand, to front cross-member 1, lying thereabove, of basic frame 1,2,3,4.

Located in front of shaft 31, which carries cutting wheels 132, is a roller 34 which rotates freely and is mounted between lateral support-arms 35 which are hinged, coaxially with the said shaft 31, pivotably to front auxiliary frame 28,128,30. The said roller may be raised and lowered in the front auxiliary frame, for example by means of an adjusting spindle 36, for the purpose of varying the depth of penetration of cutting wheels 132. Front roller 34 also runs at an angle to direction of travel F of the machine and substantially parallel with shaft 31 of cutting wheels 132.

Since adjusting spindles 36 engage with support-arms 35 carrying roller 34 which, in turn are pivotable coaxially with shaft 31, the distance between roller 34 and the path followed by blades 32 remains constant at all times.

It is desirable for roller 34 to comprise a substantially helical rib 50. Friction between this rib and the surface of the ground ensures that the said roller always rotates when the machine is in operation.

As shown in FIG. 1, the profile of blades 32 of cutting wheels 132, and the angular setting of the axis of rotation thereof (shaft 31), ensure that all of the ground covered by roller 34 is cultivated by blades 32.

Figure 6:
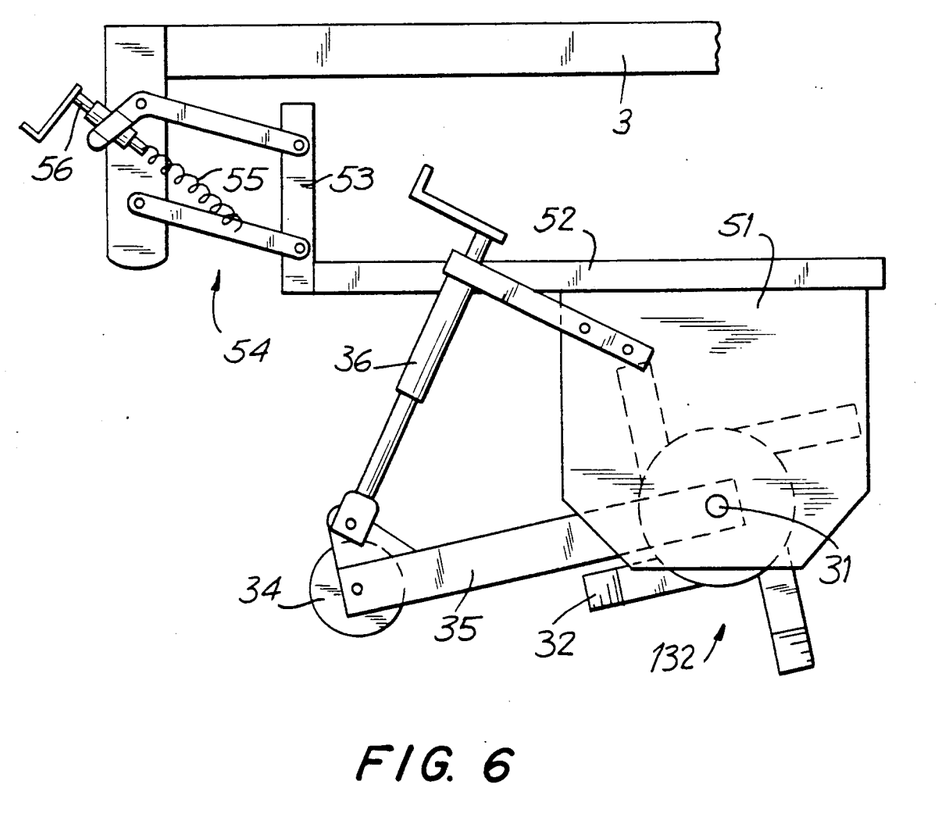
FIG. 6 shows a variant of the suspension of the first device for breaking up plant-material.

FIG. 6 shows another form of suspension for the front auxilary frame. In this case cutting wheels 132, with shaft 31, are mounted rotatably between two lateral walls 51 which are secured to two longitudinal arms 52 and carry support-arms 35 which are adapted to pivot about axis 31. Arm 52 on each side of the machine has a vertical extension 53 which is suspended from longitudinal struts 3 of the basic frame by means of an articulated quadrilateral 54. Engaging with the said quadrilateral is a spring 55 the tension of which may be adjusted by means of an adjusting screw 56. This resilient suspension enables the first device for breaking up plant-material, consisting of roller 34 and cutting wheels 132, to follow irregularities in the ground.

It is particularly desirable for the first device as a whole, consisting of roller 34 and cutting wheels 132, to be secured to the basic frame detachably, so that it may also be fitted to the front end of a tractor.

In the exemplary embodiment illustrated, shaft 24 of rotor-tools 125, intermediate shaft 47, and shaft 31 of cutting wheels 132 are driven, through a mechanical transmission, by the tractor-take-off shaft. However, it is also possible to provide these shafts with a hydraulic drive taken from the tractor-engine. It is furthermore possible to drive all of the tools on the machine by an engine-unit which is independent of the tractor. Finally, the machine as a whole may be self-propelling.

All of the wheels and rotors of the machine may be driven in either direction of rotation, or even in opposite directions. Moreover means may be provided to vary the different rotational speeds of the rotors and wheels in relation to each other.

Finally, at least some of the rotating tools may be designed to rotate freely.

Cutting wheels 132 are covered with a hood 37 the front end of which is secured to cross-member 30 of the front auxiliary frame and which extends rearwardly in cantilever. It is, of course, also possible to reverse this arrangement by securing the rear end of the hood and allowing it to project forwardly.

Hood 37 is secured to cross-member 30 by means of a conventional or a resilient hinge 38 which allows the said hood to swing up in order to avoid damage by rocks or the like. The resilient suspension of the hood also causes it to vibrate when the machine is in operation. This shakes off clods of soil or the like which would otherwise adhere to the underside of the hood.

The machine described and illustrated may be used for a very wide variety of work, especially since individual tools 112,14,125,132 and 34 can be raised and lowered independently of each other and operating depths can be adjusted individually. However, the operating depths of individual tools, arranged one behind the other, are preferably selected in such a manner as to be able to carry out the following cultivation:

front cylindrical roller 34 flattens stubble, stalks and plant-residues left over from previous cultivation and weeds growing in ground not previously cultivated, and rolls them down. Cutting wheels 132 then cut up this residual material against the soil, at the same time breaking up the soil to a limited depth, for example from 5 to 10 cm, the said cut-up residual material being mixed with the said soil. Front roller 34 is arranged relatively close to cutting wheels 132, for example about 3 cm from the outer path of travel of blades 32, so that these also ensure that roller 34 is kept free of soil. This small distance also ensures that blades 32 can also cut up the plant-material while this is still held to the ground by roller 34.

Blades 12 of ripping elements 112 penetrate more deeply into the soil, for example to a depth of between 15 and 30 cm; they rip the soil up and loosen it, but do not turn it. Plough-mould-boards 14, secured to ripping elements 112, are adjustable in height and are designed in such a manner that they partly plough-in only an upper layer of the soil ripped up and loosened by blades 12, turning it through about 90° for example; this layer of soil is harder than the layer processed by cutting wheels 132. Finally, rotor-tools 125, which act substantially as a harrow to crumble and turn the soil, operate at a lesser depth than blades 12 of ripping elements 112, but at a slightly greater depth than plough-mould-boards 14, thus preventing the said boards from forming a solid, compact, continuous surface in the ground. Rotor-tools 125 complete the turning of the soil started by plough-mould-boards 14, namely to an angle of 180°; at the same time the said tools crumble the soil and mix the layer ploughed up by boards 14 with part of the soil farther down which was lifted by blades 12 of ripping elements 112; however, below the turned and mixed layer, there remains a layer which has not been ploughed but was only ripped by blades 12.

It is essential that the foregoing operations be carried out by a machine which is of little width in the direction of travel, as compared with existing machines used for comparable work, and which requires less power, since the tractive power of the tractor is absorbed mainly by the ripping elements and the ploughshares connected thereto, while the rotating tools, such as cutting wheels 132 and rotor-tools 125, absorb the energy delivered by the tractor-engine. From this it emerges that one important feature of the machine according to the invention is that it is arranged at an angle to the direction of travel.

The agricultural machine according to the invention is preferably of modular design, making it possible to vary the width thereof by altering the number and/or the spacing of ripping elements 112, cutting wheels 132, and rotor-tools 125.

The invention is naturally not restricted to the exemplary embodiment described and illustrated; instead it may be subject to further changes and modifications. For example, it is also possible to couple the machine to, or to combine it with, other agricultural cultivating tools.

It is also possible to design the machine to be taken apart, so that individual assemblies, such as the cutting wheels and/or the rotor-tools and/or the ripping elements can be used separately, can be arranged with each other in different ways, or can be combined with other agricultural tools; to this end it is desirable for the said assemblies to have their own frames or auxiliary frames which can be connected by coupling means to the other frames and/or to the tractor.

The said assemblies, used individually or in combination with each other, may be designed in such a manner that they can be pulled or pushed by the tractor. The machine according to the invention may also be provided with means for preventing the soil from being whirled up by the ripping elements and for guiding the soil between the ploughshares and the subsequent rotor-tools, since this increases the volume of the soil, especially in the longitudinal direction, leading to accumulations and lack of uniformity in cultivation. The said means may be connected, for example, to the hood over cutting wheels 132, or they may have their own frame which is secured to the basic frame.

The agricultural machine according to the invention is particularly suitable for cultivating ground which has not been previously cultivated and is therefore overgrown with weeds; above all agricultural land which has already been cultivated and therefore has remains of such cultivation in the form of stubble, stalks, or the like. The machine cuts up the plant-material and ploughs it in, usually with a surface layer. This produces an upper layer of turned crumbled and loosened soil, an intermediate layer of soil mixed with the cut-up plant material and ploughed under, and a lower, not too deep layer of soil which has been broken up but has not been ploughed in.

It will be understood that although specific and preferred embodiments of the invention have been particularly described, the invention is not limited to those specific and preferred embodiments but extends to include mechanical and functional equivalents as indicated by the scope of the claims appended hereto The embodiments of the invention in which an exclusive property or privilege is claimed are defined as follows:

1. An agricultural machine for soil cultivation comprising:
   a plurality of rows of soil cultivating elements, each of said rows being parallel to each other, each said row of elements being arranged at an axis extending at an angle to the direction of travel of said machine, said direction angle being between about 5° to about 45°; said plurality of rows of cultivating elements comprising, in the direction of travel of said machine, a first device for breaking plant material comprising an element for bending said plant material toward said soil and, following said plant bending element, a row of rotating blades for breaking up said bent plant material against the soil.

2. The machine according to claim 1, wherein the blades at each end of said row of rotating blades define a path of travel and wherein said plant bending element is located at a distance from said path of travel of said rotating blades so that said plant material is cut by said blades in said bent position.

3. The machine according to claim 1, additionally comprising means connected to said plant bending element for adjusting the height of said element and for maintaining said distance between said element and said path of travel of said blades constant.

4. The machine according to claim 2, wherein said roller comprises means for rotatingly driving said roller by friction between said means and said soil.

5. The machine according to claim 4, wherein said rotatingly driving means consists of a helical rib wound around said roller.

6. The machine according to claim 1, wherein said plant bending element consists of a freely rotating roller.

7. The machine according to claim 1, wherein said rotating blades have a predetermined profile when viewed edgewise, said profile being selected so that when said row of rotating blades is at said direction angle, said blades break up all of said bent plant material within the area defined by said path of travel of said rotating blades.

8. The machine according to claim 7, wherein said predetermined profile of said rotating blades is an S-shaped profile.

9. The machine according to claim 1, additionally comprising a frame and suspension means connected to said first device for resiliently suspending said device from said frame so as to follow the contours of the ground passed over by said machine.

10. The machine according to claim 9, wherein said suspension means comprises an articulated quadrilateral and a tension adjustable resilient element operatively engaging said quadrilateral.

11. The machine according to claim 1, wherein said plurality of rows of cultivating elements comprises, behind said first device for breaking up said plant material, a single row of ripping elements for ripping up and lifting said soil and for plowing under said broken up plant material.

12. The machine according to claim 11, wherein said ripping elements comprise a front part for penetrating into said soil and a plow-like rear part for plowing up said soil ripped up by said front part and for covering up said broken up plant material.

13. The machine according to claim 12, wherein said rear part of said ripping element is adjustable in height relative to said front part of said ripping element.

14. The machine according to claim 13, additionally comprising guide plates mounted to said ripping elements for guiding said machine in a straight line in said direction of travel.

15. The machine according to claim 14, additionally comprising a rotatably mounted shaft parallel to and between said row of ripping elements and said row of soil breaking up tools; and clod-breakers mounted on said shaft for breaking up lumps of soil lifted by said ripping elements; said clod breakers comprising fingers radially disposed along said shaft and in offset relation to said soil breaking up tools.

16. The machine according to claim 15, wherein the rotational speed of said shaft is higher than that of said rotor tools.

17. The machine according to claim 11, wherein said plurality of rows of cultivating elements additionally comprises soil breaking up tools for breaking up said soil and for turning said broken-up soil on to said broken-up plant material.

18. The machine according to claim 17, wherein said soil breaking up tools comprise rotor tools, each rotor tool comprising a rotor and a hub secured to and rotatable about a common shaft, and a plurality of scoops affixed to said hub in staggered relation to each other.

19. The machine according to claim 18, wherein said scoops are arranged at an angle with respect to the radial direction of said hub.

20. The machine according to claim 18, additionally comprising a scraper blade operatively connected to each rotor tool for cleaning said scoops and for completing said soil cultivation.

21. The machine according to claim 20, wherein said plurality of rows of cultivating elements are carried by at least two frames, said first frame carrying said first device for breaking-up plant material and for attachment to a tractor; said second frame carrying said ripping elements and said rotor tools and, optionally, said clod-breakers; said first and second frames being suitable for soil cultivation independently of each other.

22. The machine according to claim 1, wherein said plurality of said cultivating elements is carried in a common frame for attachment to a tractor.

23. The agricultural machine according to claim 1, additionally comprising a frame, said plurality of cultivating elements mounted to said frame, said frame comprising:
a plurality of cultivating elements mounted to said frame, said frame comprising struts and cross-members having a rectangular cross-section for connecting said struts; and
clamps for mounting said elements to said frame, said clamps consisting of jaws having an angled profile, a threaded part and at least one screw for threaded engagement with said threaded part and for securing said jaws to each other and to said cross-member.

* * * * *